United States Patent
Pedersen

(10) Patent No.: US 10,327,071 B2
(45) Date of Patent: Jun. 18, 2019

(54) HEAD-WEARABLE HEARING DEVICE

(71) Applicant: GN ReSound A/S, Ballerup (DK)

(72) Inventor: Soren Christian Voigt Pedersen, Valby (DK)

(73) Assignee: GN HEARING A/S, Ballerup (DK)

(*) Notice: Subject to any disclaimer, the term of this patent is extended or adjusted under 35 U.S.C. 154(b) by 0 days.

(21) Appl. No.: 15/384,009

(22) Filed: Dec. 19, 2016

(65) Prior Publication Data
US 2017/0195791 A1 Jul. 6, 2017

(30) Foreign Application Priority Data
Dec. 30, 2015 (EP) .................................... 15203150

(51) Int. Cl.
*H04R 1/10* (2006.01)
*H04R 3/04* (2006.01)
(Continued)

(52) U.S. Cl.
CPC ................. *H04R 3/04* (2013.01); *H04R 1/10* (2013.01); *H04R 3/005* (2013.01); *H04R 25/43* (2013.01);
(Continued)

(58) Field of Classification Search
CPC .. A61F 11/06; A61B 7/04; H04R 3/04; H04R 3/005; H04R 1/10; H04R 1/0258; H04R 25/43; H04R 25/604; H04R 2460/01; H04M 3/002; H04M 3/18; G10K 15/02; G10K 15/04; G10K 2210/1081; G10K 2210/11; G10K 2210/119; G10K 2210/129; G10K 2210/3012; G10K 2210/3014; G10K 2210/3017; G10K 2210/30231;
(Continued)

(56) References Cited

U.S. PATENT DOCUMENTS 6,421,448 B1 * 7/2002 Arndt .................... H04R 25/407
381/312
6,757,395 B1 6/2004 Fang et al.
(Continued)

FOREIGN PATENT DOCUMENTS

JP 2006203358 A * 8/2006
WO WO 2008/061260 A2 5/2008
WO WO 2014194932 A1 * 12/2014 ........... H04R 25/407

OTHER PUBLICATIONS

Extended European Search Report dated Jun. 1, 2016 for corresponding EP Patent Application No. 15203150.6, 10 pages.
(Continued)

Primary Examiner — Leshui Zhang
(74) Attorney, Agent, or Firm — Vista IP Law Group, LLP

(57) ABSTRACT

The present disclosures relates to a head-wearable hearing device comprising an ambient microphone arrangement configured to receive and convert environmental sound into a microphone input signal and an ear canal microphone configured to receive and convert ear canal sound pressure into an electronic ear canal signal. The head-wearable hearing device further comprises a mixer combining a compensated ear canal signal and the microphone input signal to produce a hybrid microphone signal. The hybrid microphone signal may be transmitted to a far end recipient through a wireless or wired data communication link.

19 Claims, 3 Drawing Sheets

(51) Int. Cl.
*H04R 25/00* (2006.01)
*H04R 3/00* (2006.01)
*H04M 1/02* (2006.01)

(52) U.S. Cl.
CPC ........... *H04R 25/55* (2013.01); *H04M 1/0258* (2013.01); *H04R 25/604* (2013.01); *H04R 2225/43* (2013.01); *H04R 2225/55* (2013.01); *H04R 2460/13* (2013.01)

(58) Field of Classification Search
CPC . G10K 2210/30232; G10K 2210/3026; G10K 2210/3028; G10K 2210/30281; G10K 2210/3029; G10K 2210/3031; G10K 2210/3035; G10K 2210/3036; G10K 2210/3045; G10K 2210/3048; G10K 2210/3049; G10K 2210/3055; G10K 2210/3056; G10K 2210/3057; G10K 2210/3221; G10K 2210/3225; G10K 2210/3226; G10K 2210/505
USPC ....... 381/66, 320, 92, 93, 94.1–94.9, 95, 96, 381/97, 98, 122, 119, 71.1–71.12, 73.1, 381/74, 326, 151, 370, 375, 380, 83, 302, 381/86; 379/406.01–406.16; 455/570, 455/41.2, 41.3, 501, 63.1, 114.2; 704/E21.014, 233, E19.014, E21.002; 700/94
See application file for complete search history.

(56) References Cited

U.S. PATENT DOCUMENTS

| | | | |
|---|---|---|---|
| 9,826,319 | B2 | 11/2017 | Kunzle |
| 2008/0063228 | A1* | 3/2008 | Mejia ................... H04R 25/502 381/318 |
| 2009/0034765 | A1 | 2/2009 | Boillot et al. |
| 2009/0147966 | A1* | 6/2009 | McIntosh ............... H04R 3/005 381/71.11 |
| 2009/0264161 | A1 | 10/2009 | Usher et al. |
| 2010/0020995 | A1 | 1/2010 | Elmedyb |
| 2010/0246849 | A1* | 9/2010 | Sudo ....................... H03G 3/32 381/94.1 |
| 2011/0188685 | A1 | 8/2011 | Sheikh |
| 2012/0215519 | A1 | 8/2012 | Park |
| 2014/0126734 | A1 | 5/2014 | Gauger, Jr. et al. |
| 2014/0126756 | A1 | 5/2014 | Gauger, Jr. |
| 2015/0117660 | A1 | 4/2015 | Fletcher |
| 2016/0105751 | A1* | 4/2016 | Zurbruegg ........... H04R 25/407 381/317 |
| 2017/0054528 | A1 | 2/2017 | Pedersen et al. |
| 2018/0063654 | A1 | 3/2018 | Kuriger |

OTHER PUBLICATIONS

Communication Pursuant to Article 94 (3) OA dated Apr. 18, 2018 for corresponding European Application No. 16206243.4.
Non-Final Office Action dated May 11, 2018 for related U.S. Appl. No. 15/815,831.

* cited by examiner

HEAD-WEARABLE HEARING DEVICE

RELATED APPLICATION DATA

This application claims priority to, and the benefit of, European patent application No. 15203150.6 filed on Dec. 30, 2015, pending. The entire disclosure of the above application is expressly incorporated by reference herein.

FIELD

The present disclosure relates to a head-wearable hearing device comprising an ambient microphone arrangement configured to receive and convert environmental sound into a microphone input signal and an ear canal microphone configured to receive and convert ear canal sound pressure into an electronic ear canal signal. The head-wearable hearing device further comprises a mixer combining a compensated ear canal signal and the microphone input signal to produce a hybrid microphone signal. The hybrid microphone signal may be transmitted to a far end recipient through a wireless or wired data communication link.

BACKGROUND

Acquiring a clean speech signal is of considerable interest in numerous two-way communication application ns using a variety of head-wearable hearing devices such as headsets, active hearing protectors and hearing instruments or aids. The clean speech signal supplies a far end recipient, receiving the clean speech signal through a wireless data communication link, with a more intelligible and comfortably sounding speech signal. The clean speech signal typically provides improved speech intelligibly and better comfort for the far-end recipient e.g. during a phone conversation.

However, sound environments in which the user of the head-wearable hearing device is situated are often corrupted or infected by numerous noise sources such as interfering speakers, traffic, loud music, machinery etc. leading to a poor signal-to-noise ratio of a target sound signal arriving at an ambient microphone of the hearing device. This ambient microphone may be sensitive to sound arriving at all directions from the user's sound environment and hence tends to indiscriminately pick-up all ambient sounds and transmit these as a noise-infected speech signal to the far end recipient. While these environmental noise problems may be mitigated to a certain extent by using an ambient microphone with certain directional properties or using a so-called boom-microphone (typical for headsets), there is a need in the art to provide head-wearable hearing device with improved signal quality, in particular improved signal-to-noise ratio, of the user's own voice as transmitted to far-end recipients over the wireless data communication link. The latter may comprise a Bluetooth link or network, W-Fi link or network, GSM cellular link etc.

The present head-wearable hearing device detects and exploits a bone conducted component of the user's own voice picked-up in the user's ear canal to provide a hybrid speech/voice signal with improved signal-to-noise ratio under certain sound environmental conditions for transmission to the far end recipient. The hybrid speech signal may in addition to the bone conducted component of the user's own voice also comprise a component/contribution of the user's own voice as picked-up by an ambient microphone arrangement of the head-wearable hearing device. This additional voice component derived from the ambient microphone arrangement may comprise a high frequency component of the user's own voice to at least partly restore the original spectrum of the user's voice in the hybrid microphone signal.

SUMMARY

A first aspect relates to a head-wearable hearing device comprising:
an ambient microphone arrangement configured to receive and convert environmental sound into a microphone input signal,
a signal processor adapted to receive and process the microphone input signal in accordance with a predetermined or adaptive processing scheme for generating an processed output signal,
a loudspeaker or receiver adapted to receive and convert the processed output signal into a corresponding acoustic output signal to produce ear canal sound pressure in a user's ear canal,
an ear canal microphone configured to receive and for convert the ear canal sound pressure into an electronic ear canal signal,
a compensation filter connected between the processed output signal and a first input of a compensation summer, wherein the compensation summer is configured to subtracting the processed output signal and the electronic ear canal signal to produce a compensated ear canal signal for suppression of environmental sound pressure components. The head-wearable hearing device furthermore comprises a mixer configured to combine the compensated ear canal signal and the microphone input signal to produce a hybrid microphone signal; and a wireless or wired data communication interface configured to transmit the hybrid microphone signal to a far end recipient through a wireless or wired data communication link.

The head-wearable hearing device may comprise different types of head-worn listening or communication devices such as a headset, active hearing protector or hearing instrument or hearing aid. The hearing instrument may be embodied as an in-the-ear (ITE), in-the-canal (ITC), or completely-in-the-canal (CIC) aid with a housing, shell or housing portion shaped and sized to fit into the user's ear canal. The housing or shell may enclose the ambient microphone, signal processor, ear canal microphone and the loudspeaker. Alternatively, the present hearing instrument may be embodied as a receiver-in-the-ear (RIC) or traditional behind-the-ear (BTE) aid comprising an ear mould or plug for insertion into the user's ear canal. The BTE hearing instrument may comprise a flexible sound tube adapted for transmitting sound pressure generated by a receiver placed within a housing of the BTE aid to the user's ear canal. In this embodiment, the ear canal microphone may be arranged in the ear mould while the ambient microphone arrangement, signal processor and the receiver or loudspeaker are located inside the BTE housing. The ear canal signal may be transmitted to the signal processor through a suitable electrical cable or another wired or unwired communication channel. The ambient microphone arrangement may be positioned inside the housing of the head-worn listening device. The ambient microphone arrangement may sense or detect the environmental sound or ambient sound through a suitable sound channel, port or aperture extending through the housing of the head-worn listening device. The ear canal microphone may have a sound inlet positioned at a tip portion of the ITE, ITC or CIC hearing aid housing or at a tip of the ear plug or mould of the headset, active hearing protector or BTE hearing aid, preferably allowing unhindered sensing of the ear canal sound pressure within a fully or partly occluded ear canal volume residing in front of the user's tympanic membrane or ear drum.

The signal processor may comprise a programmable microprocessor such as a programmable Digital Signal Processor executing a predetermined set of program instructions to amplify and process the microphone input signal in accordance with the predetermined or adaptive processing scheme. Signal processing functions or operations carried out by the signal processor may accordingly be implemented by dedicated hardware or may be implemented in one or more signal processors, or performed in a combination of dedicated hardware and one or more signal processors. As used herein, the terms "processor", "signal processor", "controller", "system", etc., are intended to refer to microprocessor or CPU-related entities, either hardware, a combination of hardware and software, software, or software in execution. For example, a "processor", "signal processor", "controller", "system", etc., may be, but is not limited to being, a process running on a processor, a processor, an object, an executable file, a thread of execution, and/or a program. By way of illustration, the terms "processor", "signal processor", "controller", "system", etc., designate both an application running on a processor and a hardware processor. One or more "processors", "signal processors", "controllers", "systems" and the like, or any combination hereof, may reside within a process and/or thread of execution, and one or more "processors", "signal processors", "controllers", "systems", etc., or any combination hereof, may be localized on one hardware processor, possibly in combination with other hardware circuitry, and/or distributed between two or more hardware processors, possibly in combination with other hardware circuitry. Also, a processor (or similar terms) may be any component or any combination of components that is capable of performing signal processing. For examples, the signal processor may be an ASIC integrated processor, a FPGA processor, a general purpose processor, a microprocessor, a circuit component, or an integrated circuit.

The microphone input signal may be provided as a digital microphone input signal generated by an A/D-converter coupled to a transducer element of the microphone. The A/D-converter may be integrated with the signal processor for example on a common semiconductor substrate. Each of the processed output signal, the electronic ear canal signal, the compensated ear canal signal and the hybrid microphone signal may be provided in digital format at suitable sampling frequencies and resolutions. The sampling frequency of each of these digital signals may lie between 16 kHz and 48 kHz. The skilled person will understand that the respective functions of the compensation filter, the compensation summer, and the mixer may be performed by predetermined sets of executable program instructions and/or by dedicated and appropriately configured digital hardware.

The wireless data communication link may comprise a bi-directional or unidirectional data link. The wireless data communication link may operate in the industrial scientific medical (ISM) radio frequency range or frequency band such as the 2.40-2.50 GHz band or the 902-928 MHz band. Various details of the wireless data communication interface and the associated wireless data communication link is discussed in further detail below with reference to the appended drawings.

The wired data communication interface may comprise a USB, IIC or SPI compliant data communication bus for transmitting the hybrid microphone signal to a separate wireless data transmitter or communication device such as a smartphone, or tablet.

One embodiment of the head-wearable hearing device further comprises a lowpass filtering function inserted between the compensation summer and the mixer and configured to lowpass filter the compensated electronic ear canal signal before application to a first input of the mixer. In addition, or alternatively, the head-wearable hearing device may comprise a highpass filtering function inserted between the microphone input signal and the mixer configured to highpass filter the microphone input signal before application to a second input of the mixer. The skilled person will understand that the each of lowpass filtering function and the highpass filter function may be implemented in numerous ways. In certain embodiments, the lowpass and highpass filtering functions comprise separate FIR or IIR filters with predetermined frequency responses or adjustable/adaptable frequency responses. An alternative embodiment of the lowpass and/or highpass filtering functions comprises a filter bank such as a digital filter bank. The filter bank may comprise a plurality of adjacent bandpass filters arranged across at least a portion of the audio frequency range. The filter bank may for example comprise between 4 and 25 bandpass filters for example adjacently arranged between at least 100 Hz and 5 kHz. The filter bank may comprise a digital filter bank such as an FFT based digital filter bank or a warped-frequency scale type of filter bank. The signal processor may be configured to generate or provide the lowpass filtering function and/or the highpass filter function as predetermined set(s) of executable program instructions running on the programmable microprocessor embodiment of the signal processor. Using the digital filter bank, the lowpass filtering function may be carried out by selecting respective outputs of a first subset of the plurality of adjacent bandpass filters for application to the first input of the mixer; and/or the highpass filtering function may comprise selecting respective outputs of a second subset of the plurality of adjacent bandpass filters for application to the second input of the mixer. The first and second subsets of adjacent bandpass filters of the filter bank may be substantially non-overlapping except at the respective cut-off frequencies discussed below.

The lowpass filtering function may have a cut-off frequency between 500 Hz and 2 kHz; and/or the highpass filtering function may have a cut-off frequency between 500 Hz and 2 kHz. In one embodiment, the cut-off frequency of the lowpass filtering function is substantially identical to the cut-off frequency of the highpass filtering function. According to another embodiment, a summed magnitude of the respective output signals of the lowpass filtering function and highpass filtering function is substantially unity at least between 100 Hz and 5 kHz. The two latter embodiments of the lowpass and highpass filtering functions typically will lead to a relatively flat magnitude of the summed output of the filtering functions as discussed in further detail below with reference to the appended drawings.

The compensation filter may be configured to model a transfer function between the loudspeaker and the ear canal microphone. The transfer function between the loudspeaker and the ear canal microphone typically comprises an acoustic transfer function between the loudspeaker and the ear canal microphone under normal operational conditions of the head-wearable hearing device, i.e. with the latter arranged at or the user's ear. The transfer function between the loudspeaker and the ear canal microphone may additionally comprise frequency response characteristics of the loudspeaker and/or the ear canal microphone. The compensation filter may comprise an adaptive filter, such as an adaptive FIR filter or an adaptive IIR filter, or a static FIR or IIR filter configured with a suitable frequency response, as discussed in additional detail below with reference to the appended drawings.

According to yet another embodiment of the head-worn listening device, the signal processor is configured to:
estimate a signal feature of the microphone input signal,
controlling relative contributions of the compensated ear canal signal and the microphone input signal to the hybrid microphone signal based on the determined signal feature of the microphone input signal. According to the latter embodiment, the signal processor may control the relative contributions of the compensated ear canal signal and the microphone input signal to the hybrid microphone signal by adjusting the respective cut-off frequencies of the lowpass and highpass filtering functions discussed above in accordance with the determined signal feature. The signal feature of the microphone input signal may comprise a signal-to-noise ratio of the microphone input signal—for example measured/estimated over a particular audio bandwidth of interest such as 100 Hz to 5 kHz. The signal feature of the microphone input signal may comprise a noise level, e.g. expressed in dB SPL, of the microphone input signal. The signal processor may in addition, or alternatively, be configured to control the relative amplifications or attenuations of the compensated ear canal signal and the microphone input signal before application to the mixer based on the determined signal feature of the microphone input signal. One or both of these methodologies for controlling the relative contributions of the compensated ear canal signal and the microphone input signal to the hybrid microphone signal may be exploited to make the contribution from the compensated ear canal signal relatively small in sound environments with a high signal-to-noise ratio, e.g. above 10 dB, of the microphone input signal and relatively large in sound environments with a low signal-to-noise ratio, e.g. below 0 dB, of the microphone input signal as discussed in further detail below with reference to the appended drawings.

A second aspect relates to a multi-user call centre communication system comprising a plurality of head-wearable hearing devices, for example embodied as wireless headsets, according to any of the above described embodiments thereof, wherein the plurality of head-wearable hearing devices are mounted on, or at, respective ears of a plurality of call centre service individuals. The noise-suppression properties of the present head-wearable hearing devices make these advantageous for application in numerous types of multi-user environments where a substantial level of environmental noise of is present due numerous interfering noise sources. The noise suppression properties of the present head-wearable hearing devices may provide hybrid microphone signals, representing the user's own voice, with improved comfort and intelligibility for benefit of the far-end recipient.

A third aspect relates to a method of generating and transmitting a hybrid microphone signal to a far end recipient by a head-wearable hearing device. The method comprising:
receiving and converting environmental sound into a microphone input signal,
receiving and processing the microphone input signal in accordance with a predetermined or adaptive processing scheme for generating an processed output signal,
converting the processed output signal into a corresponding acoustic output signal by a loudspeaker or receiver to produce ear canal sound pressure in a user's ear canal,
filtering the processed output signal by a compensation filter to produce a filtered processed output signal,
sensing the ear canal sound pressure by an ear canal microphone and converting the ear canal sound pressure into an electronic ear canal signal,
subtracting the filtered processed output signal and the electronic ear canal signal to produce a compensated ear canal signal,
combining the compensated ear canal signal and the microphone input signal to produce the hybrid microphone signal; and transmitting the hybrid microphone signal to a far end recipient through a wireless or wired data communication link.

The methodology may further comprise:
estimating a signal feature of the microphone input signal or a signal derived from the microphone input signal,
controlling relative contributions of the compensated ear canal signal and the microphone input signal to the hybrid microphone signal based on the determined signal feature of the microphone input signal or the signal derived therefrom.

One embodiment of the methodology further comprises: lowpass filtering the compensated ear canal signal before combining with the microphone input signal and/or highpass filtering the microphone input signal before combining with the compensated ear canal signal. The skilled person will understand the lowpass filtering and/or the highpass filtering may comprise the application of any of the above-discussed embodiments of the filter bank to the microphone input signal and the compensated ear canal signal.

A head-wearable hearing device includes: a microphone configured to convert environmental sound into a microphone input signal; a signal processor configured to process the microphone input signal in accordance with a predetermined or adaptive processing scheme for generating an processed output signal; a loudspeaker or a receiver configured to convert the processed output signal into a corresponding acoustic output signal for producing ear canal sound pressure in a user's ear canal; an ear canal microphone configured to convert the ear canal sound pressure into an electronic ear canal signal; a compensation filter connected between the signal processor and a first input of a compensation summer, wherein the compensation summer is configured to produce a compensated ear canal signal for suppression of environmental sound pressure components based on the processed output signal and the electronic ear canal signal; a mixer configured to combine the compensated ear canal signal and the microphone input signal to produce a hybrid microphone signal; and a wireless or wired data communication interface configured to transmit the hybrid microphone signal to a recipient through a wireless or wired data communication link.

Optionally, the head-wearable hearing device further includes a lowpass filter between the compensation summer and the mixer, the lowpass filter configured for lowpass filtering the compensated electronic ear canal signal before application to a first input of the mixer.

Optionally, the head-wearable hearing device further includes a highpass filter between the microphone and the mixer, the highpass filter configured for highpass filtering the microphone input signal before application to a second input of the mixer.

Optionally, the head-wearable hearing device further includes: a lowpass filter between the compensation summer and the mixer, the lowpass filter configured for lowpass filtering the compensated electronic ear canal signal before application to a first input of the mixer; and a highpass filter between the microphone and the mixer, the highpass filter configured for highpass filtering the microphone input signal before application to a second input of the mixer; wherein one or each of the lowpass filter and the highpass filter comprises a filter bank comprising a plurality of adjacent bandpass filters arranged across at least a portion of an audio frequency range.

Optionally, the lowpass filter is configured to select respective outputs of a first subset of the plurality of adjacent bandpass filters for application to the first input of the mixer; and/or wherein the highpass filter is configured to select respective outputs of a second subset of the plurality of adjacent bandpass filters for application to the second input of the mixer.

Optionally, the head-wearable hearing device further includes: a lowpass filter between the compensation summer and the mixer, the lowpass filter configured for lowpass filtering the compensated electronic ear canal signal before application to a first input of the mixer; and a highpass filter between the microphone and the mixer, the highpass filter configured for highpass filtering the microphone input signal before application to a second input of the mixer; wherein the lowpass filter has a cut-off frequency anywhere between 500 Hz and 2 kHz; and/or wherein the highpass filter has a cut-off frequency anywhere between 500 Hz and 2 kHz.

Optionally: the cut-off frequency of the lowpass filter corresponds with the cut-off frequency of the highpass filter; and/or a summed magnitude of respective output signals of the lowpass filter and the highpass filter corresponds with an unity at least between 100 Hz and 5 kHz.

Optionally, the head-wearable hearing device is a hearing instrument or a hearing aid.

Optionally, the head-wearable hearing device is a BTE, RIE, ITE, ITC or CIC device.

Optionally, the compensation filter is configured to model a transfer function between the loudspeaker or the receiver and the ear canal microphone.

Optionally, the compensation filter comprises an adaptive filter.

Optionally, the adaptive filter comprises a digital FIR filter or a digital IIR filter.

Optionally, the signal processor is configured to: estimate a signal feature of the microphone input signal, and control respective contributions of the compensated ear canal signal and the microphone input signal to the hybrid microphone signal based on the estimated signal feature of the microphone input signal or based on a signal derived from the signal feature of the microphone input signal.

A multi-user call centre communication system includes: a plurality of head-wearable hearing devices for a plurality of call centre service individuals, respectively; wherein at least one of the plurality of head-wearable hearing devices is the head-wearable hearing device described herein.

A method of providing a hybrid microphone signal to a recipient by a head-wearable hearing device, includes: converting environmental sound into a microphone input signal; processing the microphone input signal in accordance with a predetermined or adaptive processing scheme for generating an processed output signal; converting the processed output signal into a corresponding acoustic output signal by a loudspeaker or a receiver to produce ear canal sound pressure in a user's ear canal; filtering the processed output signal by a compensation filter to produce a filtered processed output signal; converting the ear canal sound pressure into an electronic ear canal signal by an ear canal microphone; producing a compensated ear canal signal based on the filtered processed output signal and the electronic ear canal signal; combining the compensated ear canal signal and the microphone input signal to produce a hybrid microphone signal; and transmitting the hybrid microphone signal to a recipient through a wireless or wired data communication link.

Optionally, the method further includes: estimating a signal feature of the microphone input signal, and controlling respective contributions of the compensated ear canal signal and the microphone input signal to the hybrid microphone signal based on the estimated signal feature of the microphone input signal or based on a signal derived from the microphone input signal.

Optionally, the method further includes: lowpass filtering the compensated ear canal signal before combining the compensated ear canal signal with the microphone input signal; and/or highpass filtering the microphone input signal before combining the microphone input signal with the compensated ear canal signal.

Other features, advantageous, and/or embodiments will be described in the detailed description.

BRIEF DESCRIPTION OF THE DRAWINGS

In the following, various embodiments are described in more detail with reference to the appended drawings, wherein.

DETAILED DESCRIPTION OF EMBODIMENTS

Figure 1:
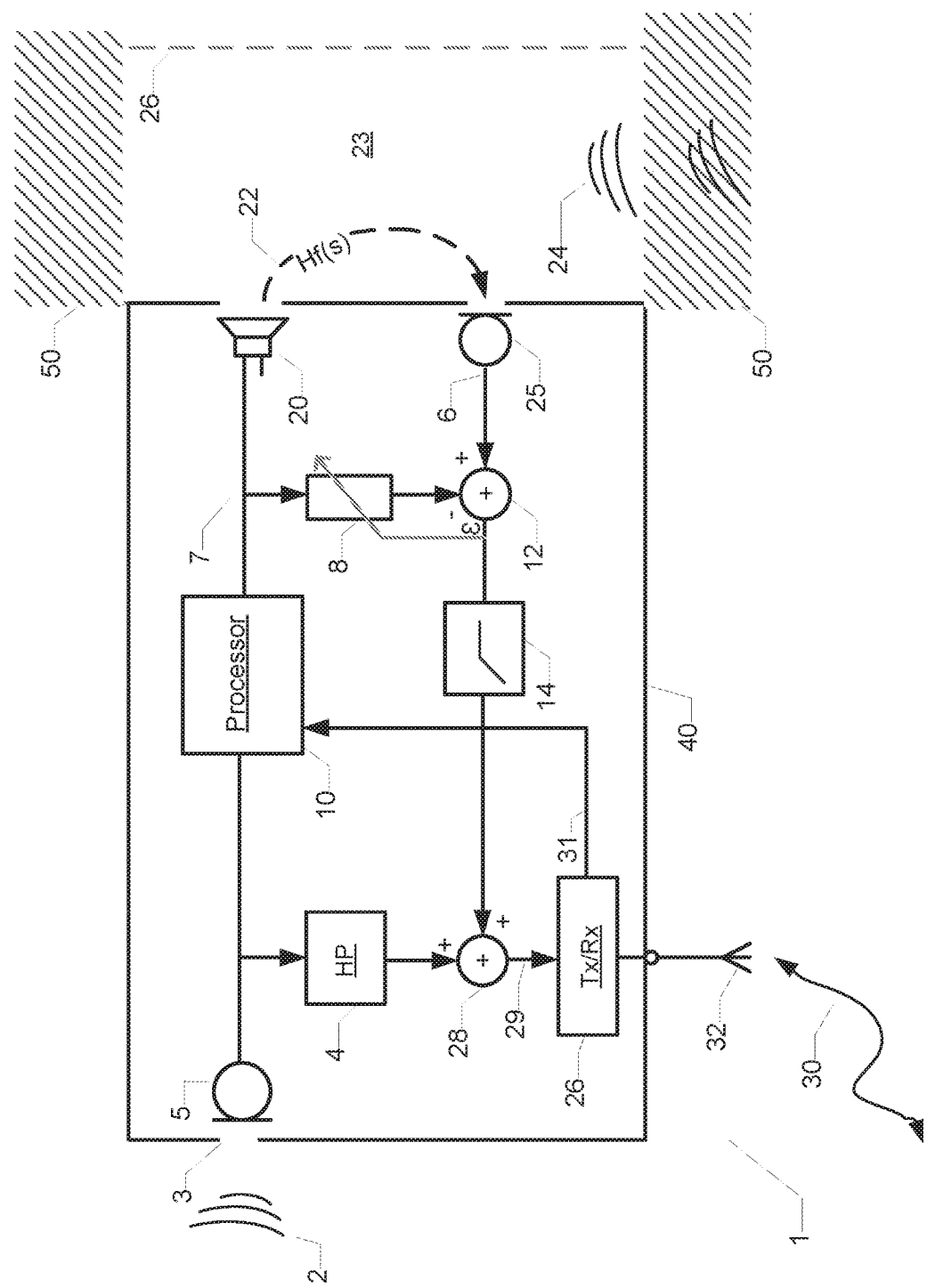
FIG. 1 illustrates schematically a head-wearable/worn hearing device in accordance with a first embodiment.

In the following various exemplary embodiments of the present head-wearable/worn hearing device are described with reference to the appended drawings.

Various embodiments are described hereinafter with reference to the figures. Like reference numerals refer to like elements throughout. Like elements will, thus, not necessarily be described in detail with respect to each figure. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates schematically a head-wearable/worn hearing device 1 in accordance with a first embodiment. The skilled person will understand that the head-worn listening device 1 may embodied as different types of head-worn listening or communication devices such as a head-set, active hearing protector or hearing instrument. The head-worn listening device 1 comprises a housing or casing 40 shaped and sized to be mounted at or on a user's ear. If the head-worn listening device 1 comprises an ITE/ITC/CIC type of hearing instrument, the housing 40 may comprise a custom made hard acrylic shell sized and shaped to fit into the user's ear canal.

The head-worn listening device 1 comprises an ambient microphone arrangement 5 configured to receive and convert environmental sound, schematically indicated by sound pressure waves 2, into a corresponding microphone input signal. The ambient microphone arrangement 5 may be situated in a proximate portion of the device housing 105 for example arranged with a sound inlet or port 3 arranged in an outwardly oriented face (projecting away from the user's head and ear) of the housing 40. The sound inlet 3 conveys environmental sound from an external environment surrounding the user's head to the ambient microphone arrangement 5. The ambient microphone arrangement 5 generates a microphone input signal in response to the impinging environmental sound representative of received sound. The skilled person will understand that the ambient microphone arrangement 5 may comprise a single microphone such as an omnidirectional microphone or a directional microphone or a plurality of individual microphones. The plurality of microphones may be arranged in a beamforming array and arranged to provide a certain amount of directionality of the microphone input signal representing the incoming ambient sound. The directional microphone or the beamforming array may provide a directional pattern pointing towards the user's mouth to suppress environmental noise in the microphone input signal.

The microphone input signal is transmitted to a signal processor 10 operatively coupled to the ambient microphone arrangement 5. The signal processor 10 may comprise a programmable microprocessor for example a low-power Digital Signal Processor (DSP). The microphone input signal may be provided in digital format or converted into digital format for example by an A/D converter positioned inside a housing of the ambient microphone arrangement 5 or an A/D converter integrally formed with the signal processor 10. Where the head-worn listening device 1 comprises a hearing instrument, the signal processor 10 may comprise a hearing loss compensating function adapted to compensate the microphone input signal in accordance with a determined hearing loss of the user. The processed output signal 7 of the signal processor 10 may therefore be appropriately compensated by taking the user's hearing loss into consideration in some embodiments—for example by amplification and/or dynamic range compression of the microphone input signal. In other embodiments such as head-sets, the processed output signal 7 may comprise an amplified and frequency response shaped replica of the microphone input signal. The processed output signal 7 is supplied to a loudspeaker or receiver 20, such as an electrodynamic miniature speaker or a miniature balanced armature receiver. The loudspeaker or receiver 20 is adapted to receive the processed output signal 7 and convert the latter into a corresponding acoustic output signal to produce sound pressure in an ear canal volume 23, in front of the user's tympanic membrane, when the head-worn listening device 1 is mounted on the user's ear. The skilled person will appreciate that the ear canal volume 23 of the user's ear canal may be fully or partly occluded depending on physical/acoustical characteristics of the housing 40 of the head-wearable hearing device 1. Hence, a first component or portion of the ear canal sound pressure is created by the acoustic output signal produced by the loudspeaker or receiver 20. This first component or portion is derived from the microphone input signal and represents the environmental sound, typically in a processed version as discussed above. However, in situations where the user's speaks for example to a far end individual/recipient during a phone conversation, the user's own voice produces a bone conducted own voice component in the ear canal volume 23 of the user's ear canal. This bone-conducted signal component of the user's own voice is schematically indicated by bone conducted sound pressure waves 24 propagating through the bony portion 50 surrounding the user's ear canal. Hence, when the user speaks or vocalizes, the total sound pressure in the ear canal volume 23 is created by acoustic summation of the environmental sound component, and the bone conducted own voice component 24.

The total sound pressure in the ear canal volume 23 is sensed by an ear canal microphone 25 of the head-worn listening device 1. The ear canal microphone 25 may for example be arranged in a distal portion of the previously discussed housing 40, or shell or ear mold of the head-wearable hearing device 1. A sound inlet or canal may be extending through the housing, shell or ear mold to allow the ear canal microphone 25 to acoustically sense or detect the total sound pressure inside the ear canal volume 23. The ear canal microphone 25 is accordingly configured to receive and the total sound pressure inside the ear canal 23 and convert the latter into a corresponding electronic ear canal signal 6 at the output of the ear canal microphone 25. The electronic ear canal signal 6 is applied to a first input of a compensation summer or operator 12. A second input of the compensation summer 12 is taken from an output of a compensation filter 8 which is connected to the processed output signal 7 such that a filtered processed output signal is applied to the second input of the compensation summer 12. The compensation filter 8 is configured to model a transfer function 22 between the loudspeaker 20 and the ear canal microphone 25. Hence, the role or function of the compensation filter 8 is to make an electronic model of the acoustic transfer function 22, schematically indicated by sound propagation path arrow Hf(s), between the loudspeaker 20 and the ear canal microphone 25. This compensation filter 8, modelling the acoustic transfer function 22, may comprise an adaptive filter or a static filter configured with a suitable frequency response as discussed in additional detail below.

The compensation summer 12 is configured to subtract the filtered processed signal and the electronic ear canal signal 6 to produce a compensated ear canal signal (ε) at an output of the compensation summer 12. Since the input to the compensation filter 8 is the processed output signal 7, which is representative of the previously discussed first component of the ear canal sound pressure (representing the environmental sound 2 at the ambient microphone arrangement 5), the filtration of the processed output signal 7 by the compensation filter 8 in conjunction with the subsequent subtraction of the latter from the electronic ear canal signal 6 produce the compensated ear canal signal (ε). In the compensated ear canal signal (ε), the first component of the ear canal sound pressure is suppressed, attenuated or essentially eliminated because of the frequency response of the compensation filter 8 representing or mimicking the acoustic transfer function 22, Hf(s), between the loudspeaker 20 and the ear canal microphone 25 as discussed above. Hence, the compensated ear canal signal (ε) is dominated by the bone conducted own voice component of the total ear canal sound pressure within the ear canal volume 23, because the (first) component of the ear canal sound pressure, representing the environmental sound, is markedly suppressed or cancelled by the subtraction operation of the compensation summer 12. The skilled person will understand that the actual amount of suppression of the environmental sound pressure components inter alia depends on how accurately the compensation filter 8 is able to model the acoustic transfer function 22 between the loudspeaker 20 and the ear canal microphone 25.

The compensated ear canal signal ($\varepsilon$) is applied to a first input of a mixer or summation unit 28, preferably through a lowpass filter 14. A second input of the mixer 28 receives the microphone input signal, preferably after filtration through an optional highpass filter 4. The mixer 9 may comprise respective signal attenuation functions to attenuate one or both of the compensated ear canal signal ($\varepsilon$) and the microphone input signal before mixing or summation. The mixer 28 therefore produces a mixer output signal 29 which comprises selected frequency components of the compensated ear canal signal ($\varepsilon$) and selected frequency components of the microphone input signal, i.e. forming a hybrid microphone signal 29. This hybrid microphone signal 29 is transmitted to the far-end individual or recipient through a bi-directional wireless data communication interface 26 and a cooperating antenna 32 of the head-worn listening device 1. The bi-directional wireless data communication interface 26 may be configured to transmit the hybrid microphone signal 29 in an appropriate digitally encoded and modulated format via a wireless data communication link 30. The bi-directional wireless data communication interface 26 is furthermore capable of receiving wireless data signals transmitted by a suitable wireless transmitter associated with the far-end individual or recipient. These wireless data signals from the far-end individual may naturally comprise speech produced by the far-end individual to enable a normal telephone conversation between the user of the head-worn listening device 1 and the far-end individual. The bi-directional wireless data communication interface 26 may comprise an RF demodulator and a decoder (not shown) for extraction of the far-end speech data/signal from the received wireless data signals. The extracted far-end speech data/signal may be transmitted by the directional wireless data communication interface 26 to a suitable data input port or data interface of the signal processor 10 via a dedicated data wire, bus or channel 31. The signal processor 10 may process the extracted far-end speech data/signal and add the processed far-end speech signal to the processed output signal 7 applied to the loudspeaker 20. Hence, allowing the user of the head-worn listening device 1 to hear the far-end speech.

The bi-directional wireless data communication interface 26 may adhere to a proprietary wireless data communication protocol or be compliant with a standardized wireless data communication protocol such as Bluetooth, W-Fi, etc. The bi-directional wireless data communication interface 26 may be connected to a compatible wireless interface of a smartphone or mobile phone which in turn is connected to the far-end recipient or individual via a cellular network. In the latter embodiment, the smartphone or mobile phone operates a relay or intermediary for the wireless communication between the user of the head-worn listening device and the far end recipient. In one embodiment, the wireless data communication interface 26 may be compliant with the package-based bi-directional wireless data communication interface described in the applicant's co-pending European patent application No. 15181384.7. The latter bi-directional wireless data communication interface is well-suited for hearing instrument applications due inter alia to its very low power consumption.

The transmission of the hybrid microphone signal 29 to the far-end speaker instead of transmitting only the microphone input signal picked-up by the ambient microphone arrangement 5 has several noticeable advantages. The signal-to-noise ratio of the hybrid microphone signal 29 may be markedly higher than the signal-to-noise ratio of the microphone input signal due to a significant amount of ambient noise corrupting the environmental sound 2. The microphone input signal may be noise-corrupted or infected by numerous noise sources such as interfering speakers, traffic, machines etc. of the surrounding environment of the user leading to a poor signal-to-noise ratio of the microphone input signal partly. The skilled person will understand that the ambient microphone arrangement 5 is directly subjected to this type of ambient noise sources. Furthermore, the already poor signal-to-noise ratio of the microphone input signal may further deteriorate in situations where the ambient microphone arrangement 5 is arranged rather far away from the user's mouth, for example when the ambient microphone arrangement 5 is arranged in the housing of a BTE, ITE, CIC style hearing instrument or headset. In the latter situation, the ambient microphone arrangement 5 is typically arranged in or at the user's outer ear, i.e. far away from the user's mouth, which means that the signal-to-noise ratio of the user's own speech as picked-up by the ambient microphone arrangement 5 deteriorates.

In contrast, the hybrid microphone signal 29 may contain a significant contribution from the bone conducted component of the user's own voice of the ear canal sound pressure in the ear canal volume 23 as discussed above. As mentioned above, the contribution from the ambient noise to the ear canal sound pressure may be largely eliminated in the compensated ear canal signal ($\varepsilon$) because of the subtraction operation of the compensation summer 12. In other words, the compensated ear canal signal ($\varepsilon$) may represent a substantially "clean" version of the user's own voice travelling to the user's ear canal 23 by bone conduction. On the other hand, the bone-conducted signal component of the user's own voice will typically possess a low-frequency dominated or tilted frequency spectrum compared to the user's natural voice. The bone-conducted signal component of the user's own voice will therefore sound less natural than desirable. Hence, a high-frequency component of the user's own voice may be derived from the microphone input signal via the previously discussed signal path through the highpass filter 4 and added to the hybrid microphone signal 29 in certain situations. This operation is leading to a more naturally sounding frequency spectrum of the user's own voice in the transmitted hybrid microphone signal 29.

The skilled person will understand that the housing 40, in particular a portion of the housing, shell or ear mold inserted into the user's ear canal, of the head-worn listening device 1 typically will provide significant attenuation of direct ambient sound propagation to the ear canal volume 23. Hence, the housing 40 may fully or at least partly occlude the ear canal volume 23 and acoustically seal the ear canal volume from the ambient sound environment.

The compensation filter 8, modelling the acoustic transfer function 22, may comprise an adaptive filter with a time-varying frequency response or a static filter with a fixed frequency response. If the compensation filter 8 is a static filter, the frequency response of the compensation filter 8 may be determined via an initialization routine or process during which the acoustic transfer function 22 is determined. The acoustic transfer function 22 is preferably determined with the head-worn listening device 1 appropriately fitted to the user's ear allowing appropriate static filter coefficients of the compensation filter 8 to be determined. On the other hand where the compensation filter 8 is an adaptive filter, the adaptation of the compensation filter 8 may be controlled by the compensated ear canal signal ($\varepsilon$) as illustrated. The adaptive compensation filter will therefore repeatedly adjust its frequency response in an effort to minimize the compensated ear canal signal (ε). An advantageous property of the adaptive compensation filter is the ability to track changes of the acoustic transfer function 22, indicated by Hf(s), between the loudspeaker 20 and the ear canal microphone 25 over time. These acoustic transfer function changes may be caused by a varying fit of the housing, plug or mold 40 of the head-worn listening device 1 to the user's ear canal.

The skilled person will understand that the lowpass and highpass filters 14, 4, respectively, may be implemented in numerous ways. In certain embodiments, the lowpass and highpass filters comprise separate FIR or IIR filters with respective predetermined frequency responses or respective adjustable/adaptable frequency responses. A cut-off or corner frequency of the lowpass filter 14, filtering the compensated ear canal signal (ε), may be between 500 Hz and 2 kHz; and/or a cut-off frequency of the highpass filter 4 may lie between 500 Hz and 2 kHz. The cut-off frequency of the lowpass filter 14 may be substantially identical to the cut-off frequency of the highpass filter 4 which typically will lead to a flat magnitude of the summed output of the lowpass and highpass filters. This will typically lead to a relatively natural perception of the user's own voice in the hybrid microphone signal 29, because the relative magnitudes between all, or at least most, of the frequency components of the user's voice are preserved. An alternative embodiment of the lowpass and highpass filters 14, 4, respectively, comprises a filter bank. The filter bank comprises both a lowpass filtering function and a highpass filtering function implementing the lowpass and highpass filters 14, 4, respectively. The filter bank comprises a plurality of adjacent bandpass filters arranged across at least a portion of the audio frequency range such as between 100 Hz and 8 kHz. The filter bank may comprise between 4 and 25 bandpass filters such as 17 adjacently positioned bandpass filters. The lowpass filter function 14 is generated by summing respective outputs of a first subset of the plurality of adjacent bandpass filters where the first subset of adjacent bandpass filters are situated in a lower frequency range of the audio spectrum. The highpass filter function 4 is generated in a similar manner by summing respective outputs of a second subset of the plurality of adjacent bandpass filters where the second subset of bandpass filters are situated in a higher frequency range of the audio spectrum. The first subset of adjacent bandpass filters may for example be arranged across a lower audio frequency range e.g. between 100 Hz and 2 kHz—for example such that a cut-off frequency of the uppermost bandpass filter is 2 kHz. Hence, effectively using the first subset of adjacent bandpass filters to provide the lowpass filtering function of the compensated ear canal signal (ε). The second subset of adjacent bandpass filters may for example be dispersed across the a higher audio frequency range between 2 kHz and 5 kHz or 8 kHz—for example such that a cut-off frequency of the lowermost bandpass filter is placed at 2 kHz. Hence, effectively using the second subset of adjacent bandpass filters to provide the highpass filtering function of the microphone input signal. The cut-off frequency of the lowpass and highpass filtering functions may conveniently be adjusted or adapted by changing the number of bandpass filters selected for each of the first and second subsets of adjacent bandpass filters.

According to one embodiment of the head-worn listening device 1, the signal processor 10 is adapted to controlling the relative contributions of the compensated ear canal signal (ε) and the microphone input signal to the hybrid microphone signal 29 by adjusting the respective cut-off frequencies of the lowpass and highpass filters 14, 4. This adjustment is preferably based on various parameters associated with the signals of the head-worn hearing device 1—for example a signal-to-noise ratio (SNR) of the microphone input signal. In this manner, the hybrid microphone signal 29 contains varying levels of microphone input signal, generated by the ambient microphone arrangement 5, and the ear canal microphone signal 6 depending on the level of ambient noise surrounding the user.

Figure 2:
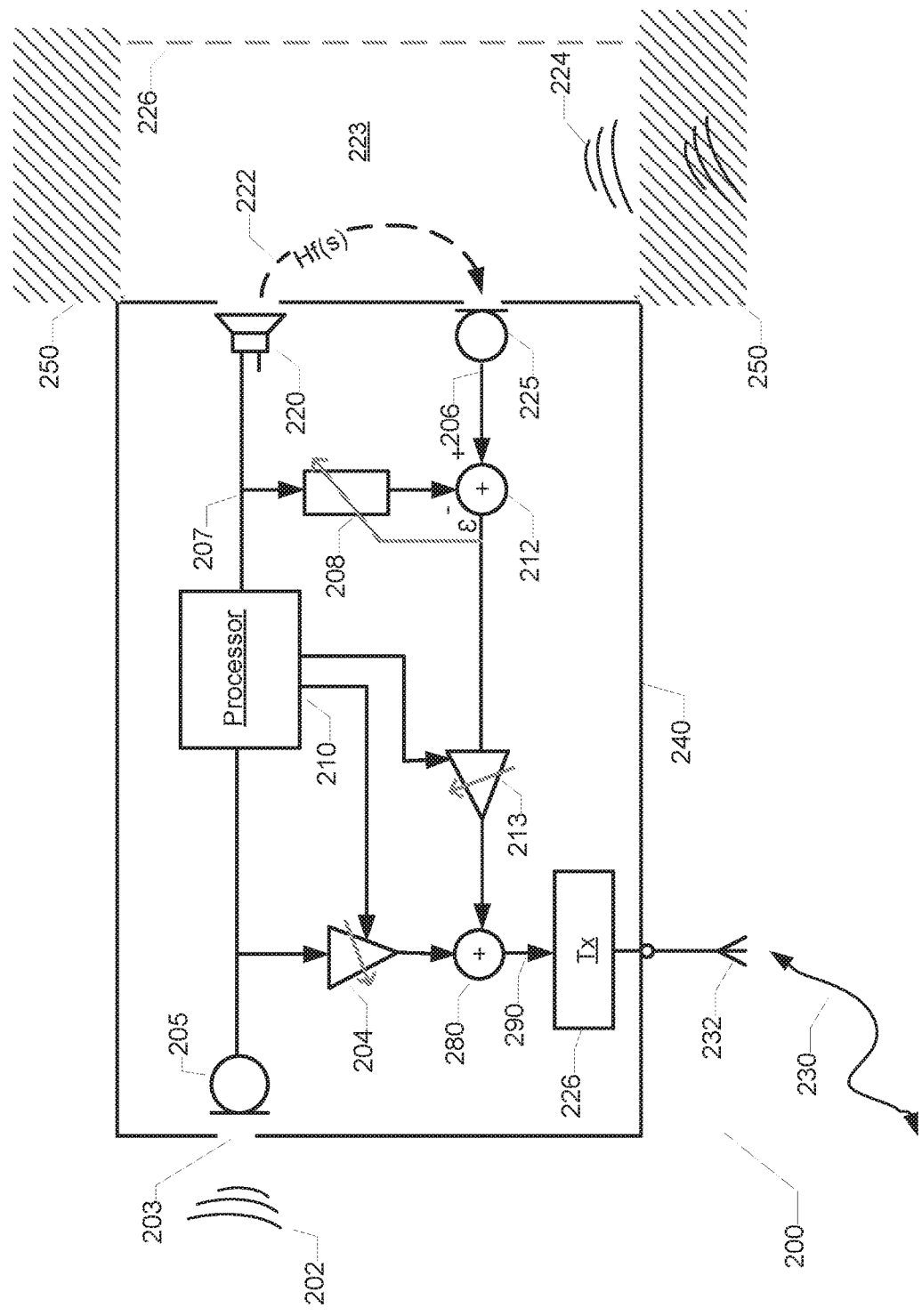
FIG. 2 illustrates schematically a head-wearable/worn hearing device in accordance with a second embodiment.

FIG. 2 illustrates schematically a head-wearable/worn hearing device 200 in accordance with a second embodiment. The head-worn hearing device 200 may be substantially identical to the previously discussed head-worn hearing device 1 except for the differences discussed below. Like features of the first and second embodiments have been provided with corresponding reference numerals.

The head-worn listening device 200 comprises a first variable gain function 206 inserted in the signal path between the microphone input signal and a first input of a mixer 280. A second variable gain function 213 is inserted in-front of a second input of the mixer 280 for amplifying or attenuating the compensated ear canal signal (ε) with an adjustable amount before applied to the mixer 280. Other embodiments may comprise only one of the first and second variable gain functions. The respective amounts of attenuation or amplification of the microphone input signal and the compensated ear canal signal (ε) are controlled by a signal processor 210 connected to each of the variable gain functions 206, 213. As discussed above, the mixer 280 combines or sums the microphone input signal and the compensated ear canal signal (ε) to form or generate a hybrid microphone signal 290. The signal processor 210 is therefore capable of controlling relative contributions of the compensated ear canal signal (ε) and the microphone input signal to the hybrid microphone signal 290. The signal processor 210 may be adapted to controlling the relative contributions of the compensated ear canal signal (ε) and the microphone input signal using various parameters associated with the signals of the head-worn hearing device 200—for example a noise level, e.g. expressed in dB SPL, of the microphone input signal or a signal-to-noise ratio (SNR) of the microphone input signal. In the latter embodiment, the signal processor 210 may be adapted to make the contribution from the compensated ear canal signal (ε) relatively small, i.e. apply large attenuation by the second variable gain function 213, when the SNR of the microphone input signal is high, i.e. corresponding to low environmental or ambient noise conditions. Hence, if the SNR of the microphone input signal is high, the content of the hybrid microphone signal 290 may be dominated by, or exclusively contains, the microphone input signal which in turn is largely composed of the user's air-born voice as picked-up by the ambient microphone arrangement 5. Oppositely, when the SNR of the microphone input signal is low, the signal processor 210 may be adapted to make the contribution from the compensated ear canal signal (ε) relatively large compared to the user's air-born voice such that the content of the hybrid microphone signal 290 is dominated by, or even exclusively contains, the compensated ear canal signal (ε). The latter ear canal signal is largely composed of the "clean" bone conducted component of the user's own voice within the ear canal volume 23 as discussed above. The signal-to-noise ratio (SNR) of the microphone input signal may be estimated or determined over a particular audio bandwidth or range of interest such as between 100 Hz and 5 kHz or between 200 Hz and 3 kHz since both frequency ranges comprise a substantial portion of typical speech components. The skilled person will appreciate that the signal processor 210 may be adapted to adjust the respective SNR based contributions of the compensated ear canal signal (ε) and microphone input signal in numerous ways for example by making a continuous adjustment of their relative contributions to the hybrid microphone signal 290 from low SNR threshold to a high SNR threshold such that the hybrid microphone signal 290 contains varying levels of microphone signal from the ambient microphone arrangement 205 and the ear canal microphone 225.

The skilled person will understand that alternative embodiments of the head-worn listening device 200 additionally may comprise lowpass and highpass filters similar to any of those lowpass filter and highpass filter embodiments of the head-worn listening device 1 discussed previously. These additional lowpass and highpass filters may be inserted in the respective signal paths before or after the first and second variable gain functions 206, 213, respectively. A major difference between the present head-worn listening device 200 and first embodiment thereof discussed above is that the wireless data communication interface 226 is uni-directional in contrast to the bi-directional wireless data communication interface 26 of the previous head-worn listening device 1. and a cooperating antenna 32 of the head-worn listening device 1. The wireless data communication interface 226 is configured solely for transmission of the hybrid microphone signal 290 to the far-end recipient. The wireless data communication interface 226 may be configured to transmit the hybrid microphone signal 290 in an appropriate digitally encoded and RF modulated format via an RF antenna 232 coupled to a wireless data communication link, channel or network 230.

Figure 3:
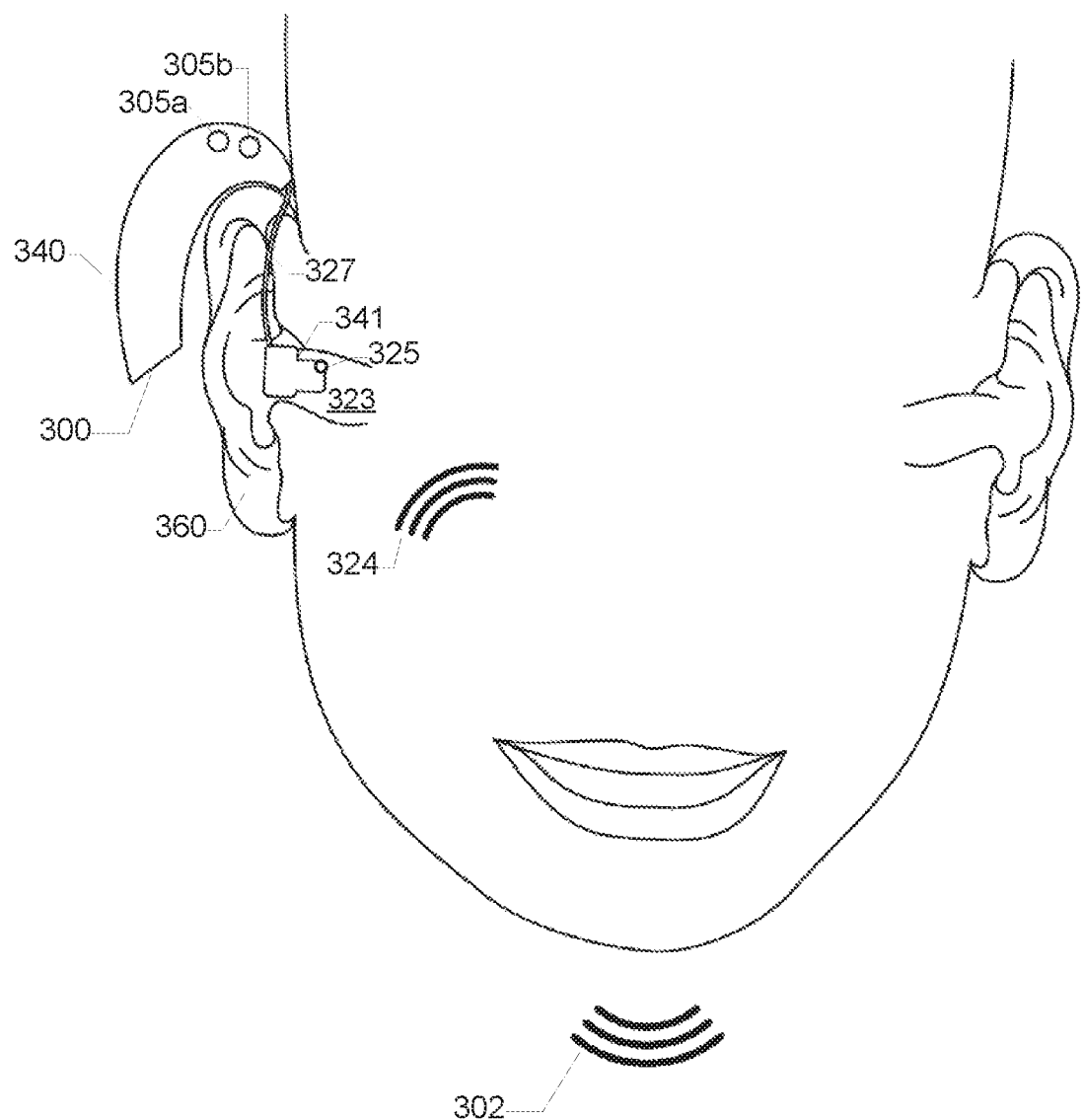
FIG. 3 illustrates schematically a head-worn hearing device comprising a BTE hearing instrument mounted on a user's ear in accordance with various embodiments.

FIG. 3 illustrates schematically a head-worn BTE hearing instrument or aid 300 mounted on a hearing impaired user's ear 360 or ear lobe in accordance with various embodiments. The skilled person will understand that head-worn BTE hearing instrument 300 may comprise any of the functions and features of the head-wearable hearing devices 1, 200 discussed above in connection with FIG. 1 and FIG. 2.

The skilled person will appreciate that other embodiments of the head-worn listening device may comprise a headset or an active hearing protector. The headset may comprise a boom supporting or holding one or more microphones of a microphone arrangement close to the user's mouth to improve the signal-to-noise ratio of the user's own voice.

The BTE hearing instrument 300 comprises a housing or casing 340 shaped and sized to fit behind the user's ear lobe as schematically illustrated on the drawing. The housing 340 comprises an ambient microphone arrangement comprising a pair of omnidirectional microphones 305a, 305b picking up environmental sound through one or more sound ports or apertures leading to an interior of the housing 340. The pair of omnidirectional microphones 305a, 305b may be used to provide directivity to the ambient microphone arrangement for example through a beamforming algorithm operating on the individual microphone signals supplied by the omnidirectional microphones 305a, 305b. The beamforming algorithm may be executed on a Digital Signal Processor (DSP) of the BTE hearing instrument to provide a microphone input signal with certain directional properties. The BTE hearing instrument 300 further comprises an ear mould or plug 341 which is inserted into the user's ear canal where the mould 341 at least partly seals off an ear canal volume 323 from the sound environment surrounding the user. The BTE hearing instrument 300 comprises a flexible sound tube 327 adapted for transmitting sound pressure generated by a receiver/loudspeaker (not shown) placed within the housing 340 to the user's ear canal through an boring or sound channel extending through the ear mould 341. The ear mould 341 comprises an ear canal microphone 325 configured to sensing or detecting the ear canal sound pressure in the user's fully or partly occluded ear canal volume 323. The ear canal volume 323 is arranged in front of the user's tympanic membrane or ear drum (not shown) as discussed above in connection with the first and second embodiments. The ear canal microphone 325 generates an electronic ear canal signal, either in digital format or analog format, representative of the sensed or measured ear canal sound pressure. The electronic ear canal signal may be transmitted to the DSP through a suitable electrical cable (not shown) for example running along an exterior or interior surface of the flexible sound tube 327. Alternative wired or unwired communication channels/links may be used for the transmission of the electronic ear canal signal to the DSP. The pair of omnidirectional microphones 305a, 305b, the DSP and a miniature loudspeaker/receiver are preferably all located inside the housing 340 to shield these components from dust, sweat and other environmental pollutants.

The origin of the bone conducted speech component of the total sound pressure in the ear canal volume 323 generated by the user's own voice is schematically illustrated by bone conducted sound waves 324 propagating from the user's mouth through the bony portion (not shown) of the user's ear canal. The vocal efforts of the user also generate an air borne component of the ear canal sound pressure of the user's own voice 302. This air borne component of the ear canal sound pressure generated by user's own voice propagates from the user's mouth to the ambient microphone arrangement 305a, 305b, the DSP, the miniature receiver, the flexible sound tube 327 and the ear mould 341 to the ear canal volume 323. As discussed above, the air borne component of the user's own voice is sensitive to noise contamination from the external environment inter alia due to the relatively long distance between the user's mouth and the ambient microphone arrangement 305a, 305b.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

The invention claimed is:

1. A head-wearable hearing device comprising:
   a microphone configured to convert environmental sound into a microphone input signal;
   a signal processor configured to process the microphone input signal in accordance with a predetermined or adaptive processing scheme for generating an processed output signal;
   a loudspeaker or a receiver configured to convert the processed output signal into a corresponding acoustic output signal for producing ear canal sound pressure in a user's ear canal;
   an ear canal microphone configured to convert the ear canal sound pressure into an electronic ear canal signal;
   a compensation filter connected between the signal processor and a first input of a compensation summer, wherein the compensation summer is configured to produce a compensated ear canal signal for suppression of an environmental sound component based on a filtered processed output signal from the compensation filter and the electronic ear canal signal, wherein the compensation filter is configured to provide the filtered processed output signal based on the processed output signal;

a mixer configured to produce a hybrid microphone signal based on a mixing of the compensated ear canal signal and the microphone input signal, the compensated ear canal signal being based on the electronic ear canal signal and the microphone input signal; and a wireless or wired data communication interface configured to transmit the hybrid microphone signal to a recipient through a wireless or wired data communication link.

2. The head-wearable hearing device according to claim 1, further comprising a lowpass filter between the compensation summer and the mixer, the lowpass filter configured for lowpass filtering the compensated electronic ear canal signal before application to a first input of the mixer.

3. The head-wearable hearing device according to claim 1, further comprising a highpass filter between the microphone and the mixer, the highpass filter configured for highpass filtering the microphone input signal before application to a second input of the mixer.

4. The head-wearable hearing device according to claim 1, further comprising:
a lowpass filter between the compensation summer and the mixer, the lowpass filter configured for lowpass filtering the compensated electronic ear canal signal before application to a first input of the mixer; and
a highpass filter between the microphone and the mixer, the highpass filter configured for highpass filtering the microphone input signal before application to a second input of the mixer;
wherein one or each of the lowpass filter and the highpass filter comprises a filter bank comprising a plurality of adjacent bandpass filters arranged across at least a portion of an audio frequency range.

5. The head-wearable hearing device according to claim 4, wherein the lowpass filter is configured to select respective outputs of a first subset of the plurality of adjacent bandpass filters for application to the first input of the mixer; and/or
wherein the highpass filter is configured to select respective outputs of a second subset of the plurality of adjacent bandpass filters for application to the second input of the mixer.

6. The head-wearable hearing device according to claim 1, further comprising:
a lowpass filter between the compensation summer and the mixer, the lowpass filter configured for lowpass filtering the compensated electronic ear canal signal before application to a first input of the mixer; and
a highpass filter between the microphone and the mixer, the highpass filter configured for highpass filtering the microphone input signal before application to a second input of the mixer;
wherein the lowpass filter has a cut-off frequency between 500 Hz and 2 kHz;
and/or wherein the highpass filter has a cut-off frequency between 500 Hz and 2 kHz.

7. The head-wearable hearing device according to claim 6, wherein:
the cut-off frequency of the lowpass filter corresponds with the cut-off frequency of the highpass filter; and/or
a summed magnitude of respective output signals of the lowpass filter and the highpass filter corresponds with an unity at least between 100 Hz and 5 kHz.

8. The head-wearable hearing device according to claim 1, wherein the head-wearable hearing device is a hearing instrument or a hearing aid.

9. The head-wearable hearing device according to claim 1, wherein the head-wearable hearing device is a BTE, RIE, ITE, ITC or CIC device.

10. The head-wearable hearing device according to claim 1, wherein the compensation filter is configured to model a transfer function between the loudspeaker or the receiver and the ear canal microphone.

11. The head-wearable hearing device according to claim 1, wherein the compensation filter comprises an adaptive filter.

12. The head-wearable hearing device according to claim 11, wherein the adaptive filter comprises a digital FIR filter or a digital IIR filter.

13. The head-wearable hearing device according to claim 1, wherein the signal processor is configured to:
estimate a signal feature of the microphone input signal, and
control respective contributions of the compensated ear canal signal and the microphone input signal to the hybrid microphone signal based on the estimated signal feature of the microphone input signal or based on a signal derived from the signal feature of the microphone input signal.

14. The head-wearable hearing device according to claim 1, wherein the environmental sound component is associated with an ambient sound in an environment surrounding the user.

15. A multi-user call centre communication system comprising:
a plurality of head-wearable hearing devices for a plurality of call centre service individuals, respectively;
wherein at least one of the plurality of head-wearable hearing devices is the head-wearable hearing device of claim 1.

16. A method of providing a hybrid microphone signal to a recipient by a head-wearable hearing device, the method comprising:
converting environmental sound into a microphone input signal;
processing the microphone input signal, by a signal processor, in accordance with a predetermined or adaptive processing scheme for generating an processed output signal;
converting the processed output signal into a corresponding acoustic output signal by a loudspeaker or a receiver to produce ear canal sound pressure in a user's ear canal;
filtering the processed output signal by a compensation filter to produce a filtered processed output signal;
converting the ear canal sound pressure into an electronic ear canal signal by an ear canal microphone;
producing a compensated ear canal signal based on the filtered processed output signal and the electronic ear canal signal;
producing a hybrid microphone signal based on a mixing of the compensated ear canal signal and the microphone input signal, the compensated ear canal signal being based on the electronic ear canal signal and the microphone input signal; and
transmitting the hybrid microphone signal to a recipient through a wireless or wired data communication link.

17. The method of claim 16, further comprising:
estimating a signal feature of the microphone input signal, and
controlling respective contributions of the compensated ear canal signal and the microphone input signal to the hybrid microphone signal based on the estimated signal feature of the microphone input signal or based on a signal derived from the microphone input signal.

18. The method of claim 16, further comprising:
lowpass filtering the compensated ear canal signal before combining the compensated ear canal signal with the microphone input signal; and/or
highpass filtering the microphone input signal before combining the microphone input signal with the compensated ear canal signal.

19. A head-wearable hearing device comprising:
a microphone configured to convert environmental sound into a microphone input signal;
a signal processor configured for generating an processed output signal based on the microphone input signal;
a loudspeaker or a receiver configured to produce ear canal sound pressure in a user's ear canal based on the processed output signal;
an ear canal microphone configured to convert the ear canal sound pressure into an electronic ear canal signal;
a summer configured to provide a summer output based on the electronic ear canal signal;
a mixer configured to produce a hybrid microphone signal based on a mixing of (1) a compensated signal, and (2) the microphone input signal, the compensated signal being based on the electronic ear canal signal and the microphone input signal; and
a wireless or wired data communication interface configured to transmit the hybrid microphone signal to a recipient through a wireless or wired data communication link.

* * * * *